May 27, 1941. G. M. WALTON ET AL 2,243,323
UNIT FILTER
Filed June 7, 1939 2 Sheets-Sheet 1

INVENTORS
GEORGE M. WALTON &
CLARENCE J. GLANZER
BY
Hyde, Higley & Meyer
ATTORNEYS Patented May 27, 1941

2,243,323

UNITED STATES PATENT OFFICE 2,243,323

UNIT FILTER

George M. Walton, Cleveland Heights, and Clarence J. Glanzer, Lakewood, Ohio, assignors to Air-Maze Corporation, Cleveland, Ohio, a corporation of Delaware Application June 7, 1939, Serial No. 277,836

5 Claims. (Cl. 183—69)

This invention relates to improvements in unit filters of the type generally used in panel form for filtering foreign matter out of fluid streams, such as for instance the filters used in air streams in air conditioning units, warm air furnaces and the like.

One of the objects of the present invention is to provide a filter unit which is cheaply constructed but efficient in its operation and very easily cleaned when occasion requires.

Another object of the present invention is to provide a unit having a plurality of screen layers so constructed and arranged that the pressure differential across each screen layer is approximately the same both when the screen is clean and when it is dirty. It results from this construction that all of the layers of the unit become dirty at approximately the same rate so that maximum advantage is derived from each layer of the unit.

Another object of the present invention is to provide a unit filter comprised of a plurality of layers of corrugated screen wherein the corrugations are deeper in that screen which first engages the dirt-bearing fluid stream, giving additional area and space for receiving dirt particles in the first screen to prevent clogging of the unit at that point.

Another object of the present invention is to provide a unit filter wherein the screens are arranged to give a progressive density of the dirt-engaging wires from the upstream side to the downstream side of the filter.

Other objects and advantages of the present invention will be apparent from the accompanying drawings and specification and the essential features thereof will be set forth in the claims.

Figure 1:
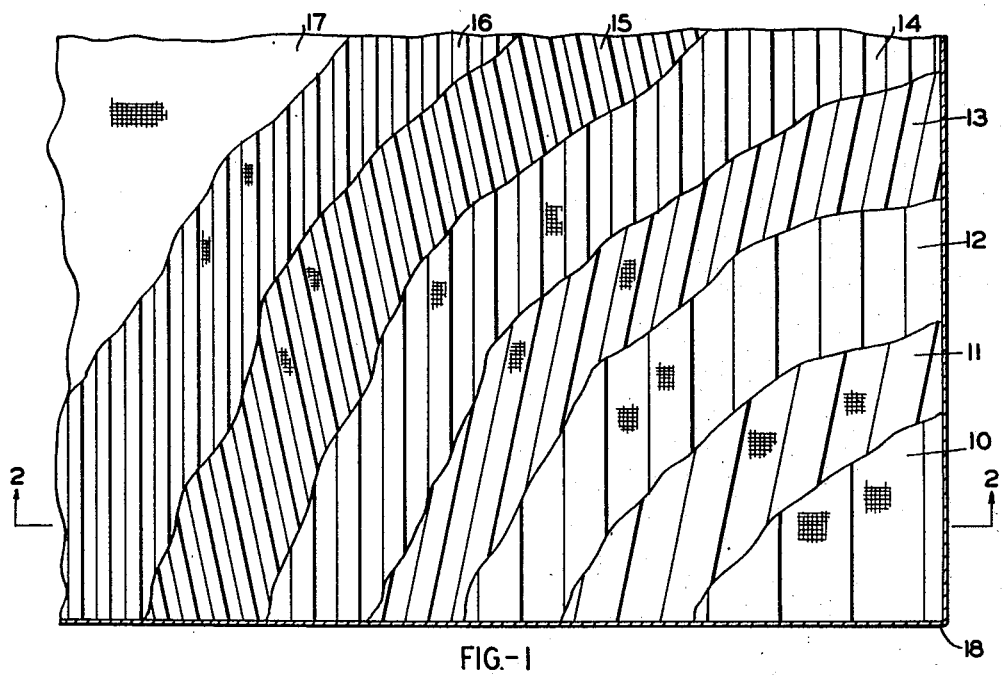
Figure 2:
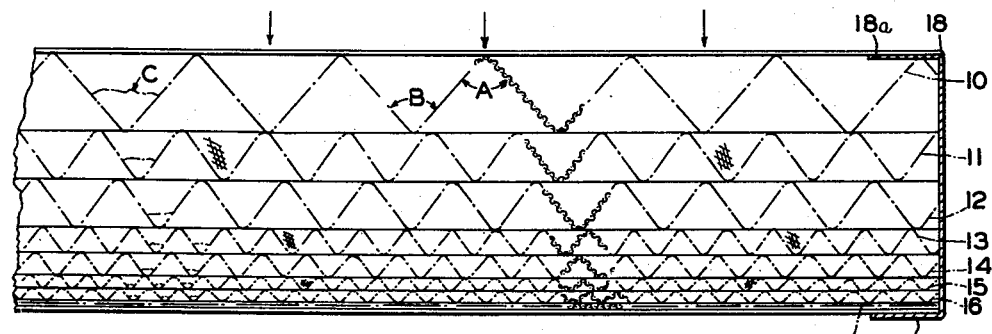
Figure 3:
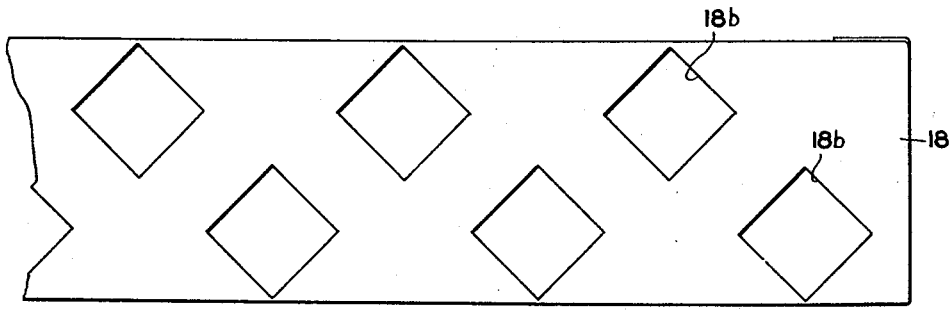
Figure 5:
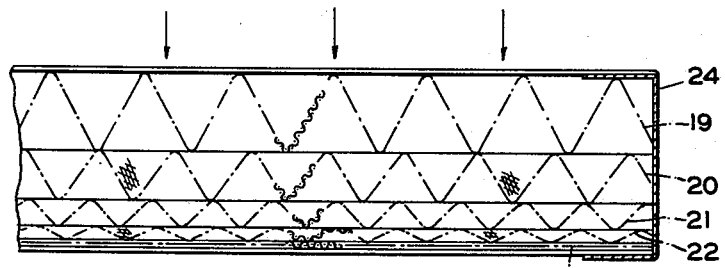
Figure 4:
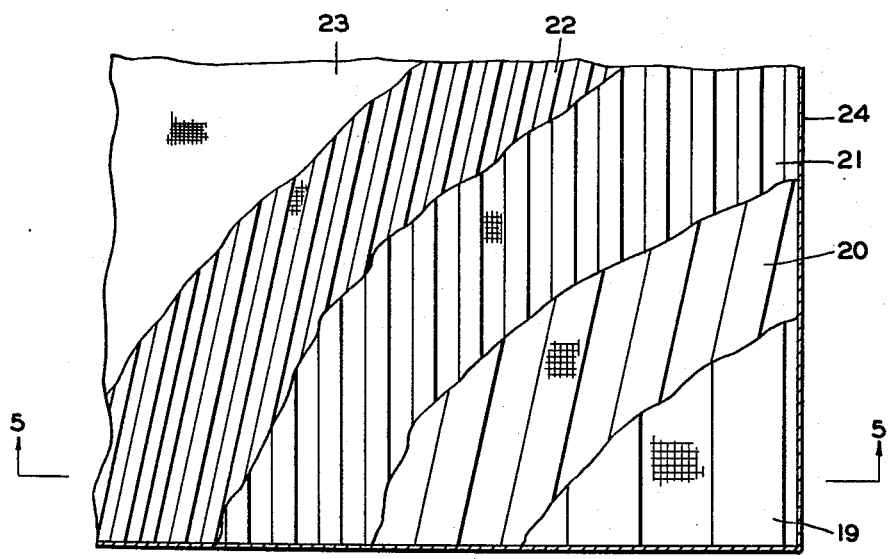
Figure 6:
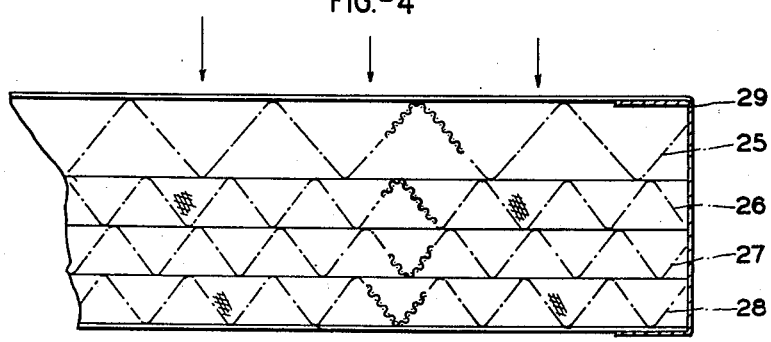

In the drawings, Fig. 1 is a plan view of a filter unit embodying our invention, comprising a plurality of layers and with various layers broken away in order to more clearly illustrate the construction; Fig. 2 is a sectional view of the device of Fig. 1 taken along the line 2—2 thereof; Fig. 3 is a partial bottom plan view of the device of Fig. 1; Fig. 4 is a plan view of a modified form of screen, this view being broken away as in Fig. 1 to show the arrangement of the various layers; Fig. 5 is a sectional view taken along the line 5—5 of Fig. 4; while Fig. 6 is a sectional view similar to Figs. 2 and 5 and showing a third modification.

The device of Figs. 1 to 3 is a unit filter of the panel type comprising a plurality of screen layers which have been given reference characters reading from 10 to 17 in the direction of stream travel, that is to say, screen 10 is on the upstream side and first engages the dirt-bearing fluid stream. As more clearly seen in Fig. 2, all of the screens extend generally transversely of the fluid stream and all of them are corrugated and arranged in a manner to prevent nesting. Preferably the corrugations of screens 10, 12, 14 and 16 run vertically and those of screens 11, 13 and 15 extend at an angle to the vertical as is clearly indicated in Fig. 1. Screen 17 may or may not be part of the unit and is here shown as a flat screen closing the downstream side of the unit. A casing or housing 18 encloses the sides of the unit parallel to the direction of stream flow and is folded over slightly at the opposite end faces of the unit as shown at 18a providing a frame for the unit open on the upstream and downstream faces for clear flow of fluid therethrough. Openings 18b may be provided in the bottom wall of the casing 18 for drainage purposes when the screens are cleaned or sprayed with oil.

Referring to Fig. 2 it will be noted that screen 10, which is the first to engage the dirt-bearing fluid stream has corrugations which are preferably at least fifty per cent deeper than the corrugations of any of the succeeding screens in the unit. We find that a very satisfactory unit for use in air conditioning systems and warm air furnaces may be constructed of fourteen or sixteen mesh screen, wherein layer 10 has corrugations approximately five-eighths of an inch deep and of the succeeding layers, 11 and 12 have three-eighths inch corrugations, 13 and 14 have three-sixteenth inch corrugations, and 15 and 16 have three-thirty seconds inch corrugations. It will be noted that in this modification the angles A and B at the ridges and valleys of the corrugations are approximately the same in each layer throughout the unit.

An inspection of Fig. 2 will indicate the increasing density of the screens presented to the dirt-bearing stream per unit of its lengthwise flow as it passes through the filter. This is due to the decreasing depth of corrugations in screens 10 to 16. The reason for this of course is that as the stream passes through the filter the larger particles are deposited on the first engaged screens so that only the smaller particles pass through to the later engaged layers of screen in the unit and therefore a greater density of screen should be presented to the dirt-bearing stream as it goes progressively farther through the filter unit.

As indicated at the left of Fig. 2, at C, dirt particles will tend to collect in the valleys of the corrugations as the filter unit removes dirt from the stream. Naturally the first engaged screen 10 removes more and larger particles than any of the succeeding screens. The value of the deep corrugations in the screen 10 therefore is that the dirt may be piled up to a greater extent in the valleys of the screen 10 without clogging the screen so as to make it necessary to clean the entire unit. It results from the arrangement of the screens described that the dirt builds up in lesser amounts in screens 11 and 12, and so on through the unit as indicated by the dot-dash lines at the left of Fig. 2 so that when any one screen is dirty enough to compel a cleaning of the unit all of the other screens are equally dirty, that is to say, they do not carry the same amount of dirt but the dirt is deposited on each of them to such an extent that the pressure differential is built up approximately the same amount in screen 10, 11, 12 etc., on through the unit.

A unit of this type is cleaned by removing it and treating it with a steam or hot water bath to remove all dirt, after which the unit is dried and sprayed with oil and is then ready for reinstallation in condition as good as new.

The arrangement here disclosed of the corrugated wire screens arranged in layers with progressively shallower corrugations from the upstream side to the downstream side of the unit and with the crossing corrugations in adjacent layers, is perfectly adapted for use in a normal dirt-bearing stream in a warm air furnace or air conditioning unit with almost perfect elimination of dirt from the stream and with a minimum of pressure loss through the unit. It will be understood that the same principles here disclosed may be utilized to filter other types of material from streams encountered in other places.

In the modification of Figs. 4 and 5, screens 19 to 23 are housed in a casing 24 in the same fashion as described in connection with the first modification. Here the corrugations become shallower as the stream progresses through the unit and by making the angles at the ridges and valleys of the corrugations progressively more obtuse from screen 19 to screen 22, as shown in Fig. 5, we obtain a still greater area in the screens on the upstream side and a greater depth of corrugation than is possible in the modification of Fig. 2. There is thus even greater room for dirt in the deep corrugations of screen 19 in comparison with the following screens than there was in screen 10 and the succeeding screens of Fig. 2. We have also indicated on the various screens of Fig. 4 a wire mesh becoming progressively finer as the downstream side of the unit is approached so as to provide in still another way an increasing density of wires engaging the stream as it progresses through the unit. In the modification of Figs. 4 and 5 there is only one screen having the depth of corrugations indicated at 20, 21 and 22, respectively, but it will be understood that these screens might be arranged in pairs if desired, following the construction shown in Fig. 2 in the pairs 11—12, 13—14, etc.

It is cheaper to use two screens just alike as indicated at 11 and 12, rather than to provide the large number of variations in corrugations which would be necessary if one were to theoretically vary the corrugations in every layer of every unit.

In the modification of Fig. 6, screens 25 to 28 are shown housed in a casing 29 similar in all respects to the previously described units. Here a simplified form of screen is shown wherein 25 has the deeper corrugations and 26, 27 and 28 are all alike. While this screen would not be quite as efficient as the others heretofore described, nevertheless it would be fairly satisfactory because it embodies one of the essential features of our unit, namely, the deep corrugations in the upstream screen 25 so that a large amount of dirt may be packed into the valleys of screen 25 without clogging that first screen. It is intended that the corrugations of screens 26 and 28 should extend at an angle to the corrugations of screens 25 and 27 so as to prevent nesting between the screen layers in the cheap and efficient manner previously described. The mesh of screens 25 to 28 may be the same as in Figs. 1 to 3 or it may be progressively finer from 25 to 28 as in the case of Figs. 4 and 5.

Those familiar with this art will appreciate that we have here disclosed a unit which can be made very cheaply using very cheap wire screen, namely, galvanized flyscreen of fourteen or sixteen mesh. No flat screens or separators need be used because the crossing corrugations permit direct contact between the corrugated layers. We are thus able to produce a unit as cheap as those of the "throw-away" type made of hair, cellulose, glass and the like. Our improved device has advantages over these other cheap types in that it is cleanable for reuse and it is more efficient in use because it is uniform in filtering effect throughout the area of the unit, whereas the other cheap types have varying densities where loose material such as hair or cellulose becomes packed unevenly.

In all of the forms of our device, we provide a progressive density of the dirt-retaining wires from the upstream side to the downstream side of the filter. By this we mean that, per unit length of stream travel, the dirt-bearing stream engages more screen wires toward the downstream side of the filter than toward the upstream side thereof. In the form of Figs. 1 to 3 this is accomplished by using the same mesh in all of the screens but varying the depth of the corrugations, and it is obvious from Fig. 2 that the dirt-bearing stream engages more screen wires per unit length of stream travel in layers 13, 14, 15 than in layers 10, 11, 12. In the form of Figs. 4 and 5 the screens 19 to 23 are of progressively finer mesh thus increasing the density of wires as the stream passes through the filter, although the corrugations in screens 19 to 22 become progressively shallower which to some extent gives a result similar to that in Figs. 1 to 3. In other words, we provide progressively increasing density of the screens in Figs. 1 to 6, by making the corrugations progressively shallower, and in Figs. 4 and 5 (and Fig. 6 if desired) we enhance this effect by making the screens of progressively finer mesh.

What we claim is:

1. A unit filter for placement in a dirt-bearing fluid stream, said filter having a plurality of layers of corrugated screens, each screen extending generally in a plane transverse to the direction of stream travel, and the corrugations being progressively shallower in screens from the upstream side to the downstream side of said unit in such proportion that the screens become clogged with dirt at approximately equal rates.

2. A unit filter for placement in a dirt-bearing fluid stream, said filter having a plurality of corrugated screens, each screen extending generally in a plane transverse to the direction of stream travel, the corrugations in each screen being parallel and substantially V-shape in section, the mesh of all of said screens being substantially the same, the corrugations in all of said screens having an angle of approximately seventy-five degrees at their valleys and ridges, and the relationship of the depth of the corrugations of said screens from the upstream side to the downstream side of said unit being 20, 12, 12, 6, 6, 3 respectively.

3. A filter for placement in a dirt-bearing fluid stream, said filter having a plurality of layers of corrugated screens, each screen extending generally transversely to the direction of stream travel, and the corrugations in said screens providing progressively less area in screens placed successively along the path of stream travel, said screens being arranged to collect dirt approximately in proportion to their areas, whereby said screens become clogged at approximately the same rate.

4. A filter for placement in a dirt-bearing stream comprising a plurality of layers of screens extending generally transversely to the direction of stream travel, and the dirt removing capacity of screens engaged by the stream at successive points along its path of travel being approximately proportionate to the amount of dirt in the stream at said points, whereby said screens become dirty at approximately equal rates.

5. A unit filter for placement in a dirt-bearing fluid stream, said filter having a plurality of layers of corrugated screens, each screen extending generally in a plane transverse to the direction of fluid travel, and the depth of the corrugations being so proportioned that the screen first engaged by the stream provides substantially unobstructed passage for the fluid flow until the screens downstream become clogged.

GEORGE M. WALTON.
CLARENCE J. GLANZER.